J. H. Elward,
Jaw Trap,

No 51,933.  Patented Jan. 9, 1866.

Witnesses.
J. J. Peyton
Theodore Lang

Inventor.
J. H. Elward
By Baldwin & Co.

UNITED STATES PATENT OFFICE.

JOHN H. ELWARD, OF POLO, ILLINOIS.

IMPROVEMENT IN ANIMAL-TRAPS.

Specification forming part of Letters Patent No. 51,933, dated January 9, 1866.

*To all whom it may concern:*

Be it known that I, JOHN H. ELWARD, of Polo, in the county of Ogle and State of Illinois, have invented a new and useful Improvement in Animal-Traps; and I do hereby declare that the following is a full, clear, and exact description of the construction and operation of the same, reference being had to the accompanying drawings, making a part of this specification, in which—

Figure 1:
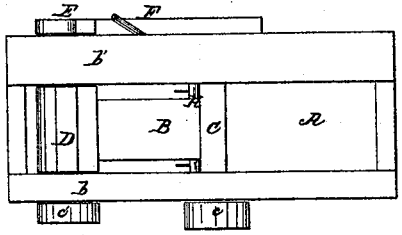
Figure 2:
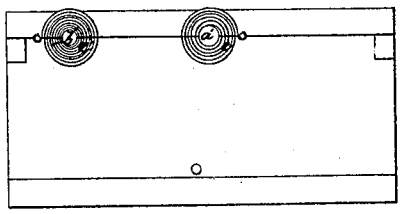
Figure 3:
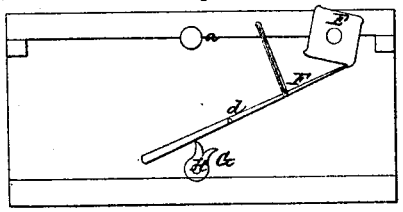
Figure 4:
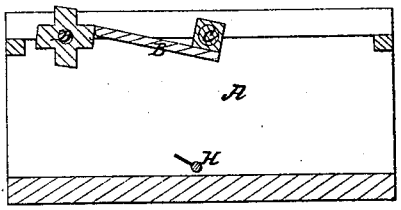

Figure 1 is a top view of my trap. Fig. 2 is a side elevation of the same. Fig. 3 is a view of the opposite side, in elevation, and Fig. 4 is a sectional view thereof.

It is the object of my invention to strike the animal entering the trap a deadly blow from a revolving lever so arranged that after each blow the trap shall be automatically reset; and my invention consists in arranging, in an open passway, a lever on a revolving shaft, to be actuated by a spring, in combination with a detent actuated by a spring and controlled by a lever-pawl and ratchet-wheel, all arranged in such manner for joint operation as that after each blow of the lever the trap shall be set automatically, ready for the next animal that enters the open passway.

I construct a rectangular trough, A, of any suitable material, open at each end, and wide enough to form an easy passway for the animals designed to be destroyed, the sides being sufficiently high to allow a free rotation to a lever, B, within the trough, when this lever is secured to a rotating-shaft, C, having suitable bearings $a$ and $a'$ upon the sides of the trough. These sides also carry journal-boxes $b$ and $b'$ for the support of the shaft D. On the center of this shaft I arrange two or more suitable stops, and to one end of both shaft C and D coiled springs $c$ and $c'$ are properly attached, by one end, while the other end of each spring is secured to the side of the trough. The opposite end of the shaft D carries a ratchet-wheel, E, that is controlled, to prevent the spring from unwinding, by a lever-pawl, F, having a fulcrum at $d$ and a notched button, G, near its lower end, the button G being connected with a rod, H, that passes transversely across the bottom of the trough, to which the bait is to be attached. The shafts C and D are placed at such a distance apart as that when the lever B is in a horizontal position it will rest against one of the stops with sufficient force to prevent the rotation of the shaft C from the tending of its spring to unwind.

The operation is as follows: The springs being wound up tightly, and the lever brought to a rest against its stop, the trap is baited, and when an animal enters the trough at either end and pulls on the bait it will move the cross-bar and the button on its outer end. This will release the lever-pawl from the ratchet, when the tending of the springs to unwind will release the rotating lever, which, by its blow, will kill the animal, and throw it to a distance out of the trough, and when this takes place the button will return to its determined position and permit the lever-pawl to arrest the shaft carrying the stops, and will arrest the rotating lever, and thus the trap will be automatically set for the next animal that enters the trough.

It is obvious that my invention is capable of killing animals of larger as well as smaller size, and may be as effective in destroying wolves as mice.

I am aware that spring-traps have been used with a spring-lever that would be reset automatically after destroying one or more animals, and therefore I do not claim substantially any of the devices here described; but What I do claim as my invention, and desire to secure by Letters Patent, is—

The combination of the revolving lever with a revolving stop, when arranged and operating substantially in the manner and for the purpose described.

In testimony whereof I have hereunto subscribed my name.

JOHN H. ELWARD.

Witnesses:
 EDM. F. BROWN,
 HORACE HOLT.